United States Patent [19]
Schröder et al.

[11] 3,920,821
[45] Nov. 18, 1975

[54] PHARMACEUTICAL COMPOSITIONS CONTAINING A (5-NITRO-2-FURYL)-SUBSTITUTED 2-HYDROXY-PYRIDINE AND METHOD OF USE

[75] Inventors: Ludwig Schröder, Ingelheim am Rhein; Klaus Thomas, Gau-Algesheim; Hanns Goeth, Biberach an der Riss, all of Germany

[73] Assignee: Boehringer Ingelheim GmbH, Ingelheim am Rhein, Germany

[22] Filed: July 1, 1974

[21] Appl. No.: 484,791

Related U.S. Application Data
[62] Division of Ser. No. 290,334, Sept. 19, 1972, Pat. No. 3,829,426.

[30] Foreign Application Priority Data
Sept. 22, 1971 Germany.............................. 2147288

[52] U.S. Cl. ................................................ 424/263
[51] Int. Cl.² .......................................... A61K 31/44
[58] Field of Search ................................... 424/263

*Primary Examiner*—Jerome D. Goldberg
*Attorney, Agent, or Firm*—Hammond & Littell

[57] ABSTRACT

Antimicrobial pharmaceutical compositions containing as an active ingredient a compound of the formula

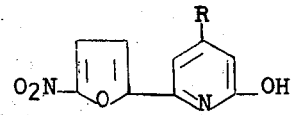

or

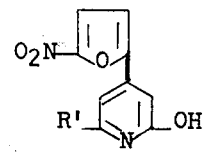

wherein
  R is hydrogen, pyridyl, alkyl of 1 to 4 carbon atoms, phenyl, p-chloro-phenyl, p-(alkyl of 1 to 4 carbon atoms)-phenyl, p-nitro-phenyl or 3,5-dinitro-4-hydroxy-phenyl, and
  R' is hydrogen, pyridyl or alkyl of 1 to 4 carbon atoms,
or a 2(1H)-pyridone tautomer thereof; and methods of using the same.

10 Claims, No Drawings

PHARMACEUTICAL COMPOSITIONS CONTAINING A (5-NITRO-2-FURYL)-SUBSTITUTED 2-HYDROXY-PYRIDINE AND METHOD OF USE

This is a division of copending application Ser. No. 290,334, filed Sept. 19, 1972, now U.S. Pat. No. 3,829,426 issued Aug. 13, 1974.

This invention relates to novel pharmaceutical compositions containing as an active antimicrobial ingredient a (5-nitro-2-furyl)-substituted 2-hydroxy pyridine or a 2 (1H)-pyridone tautomer thereof, as well as to methods of using the same as antimicrobial agents, especially against gramnegative microorganisms.

More particularly, the present invention relates to antimicrobial pharmaceutical compositions containing as an active ingredient a nitrofuryl-substituted 2-hydroxypyridine of the formula

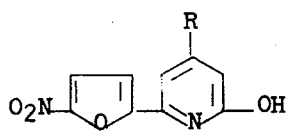  (I)

or

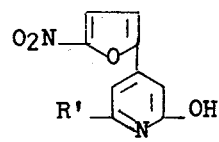  (Ia)

wherein
R is hydrogen, pyridyl, alkyl of 1 to 4 carbon atoms, phenyl, p-chloro-phenyl, p-(alkyl of 1 to 4 carbon atoms)-phenyl, p-nitro-phenyl or 3,5-dinitro-4-hydroxyphenyl, and
R' is hydrogen, pyridyl or alkyl of 1 to 4 carbon atoms, or a 2(1H)-pyridone tautomer thereof.

The compounds embraced by formulas I and Ia may be prepared by nitrating a furfuryl-substituted 2-hydroxy-pyridine of the formula

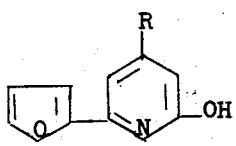  (II)

or

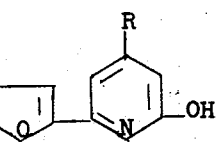  (IIa)

wherein R and R' have the same meanings as in formulas I and Ia, pursuant to conventional methods, such as by reaction with a mixture of concentrated nitric acid and concentrated sulfuric acid at a temperature between −20° and +20°C.

The starting compounds of the formulas II and IIa in turn, may be prepared by the following methods:

Method A

By first preparing an α,β-unsaturated ketone of the formula

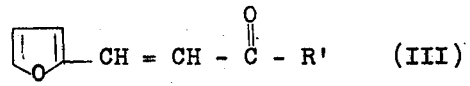  (III)

wherein R' has the same meanings as in formula Ia, pursuant or analogous to the procedure described in Arch. Pharm. 297 (1964), 42 et seq., and subjecting said ketone to a condensation reaction with a pyridinium salt of the formula

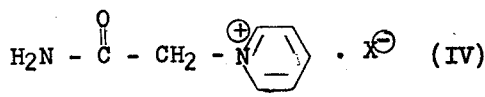  (IV)

wherein X is halogen, preferably chlorine, pursuant or analogous to the procedure described in Chem. Ber 90 (1957), 711, whereby a compound of the formula IIa is obtained.

Method B

By reacting an α, β-unsaturated ketone of the formula III with a pyridinium salt of the formula

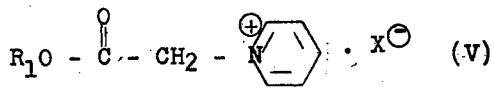  (V)

wherein $R_1$ is methyl or ethyl and X is halogen, preferably chlorine, in the presence of ammonium acetate and of a suitable solvent medium, preferably glacial acetic acid or ethanol, pursuant or analogous to the procedure described in Chem. Ber. 103 (1970), 322, whereby a compound of the formula IIa, is also formed.

Method C

By reacting a Mannich base of the formula

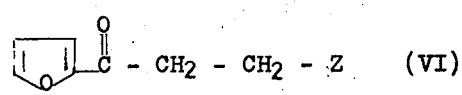  (VI)

wherein Z is secondary amino, such as dimethylamino or piperidino, or a salt thereof, with a pyridinium salt of the formula V under the conditions set forth in Method B, whereby the compound of the formula II wherein R is hydrogen is obtained.

Method D

By subjecting 2-acetyl-furan to a condensation reaction with a pyridyl-aldehyde (see German Offenlegungsschrift 2,001,819) in the presence of perchloric acid to form a ketone of the formula

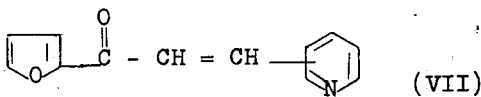 (VII)

which may then be cyclized pursuant to Method A or B with a pyridinium salt of the formula IV or V to yield a compound of the formula

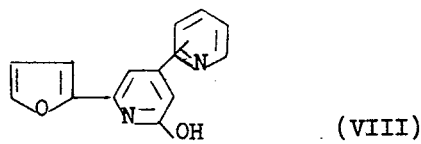 (VIII)

Method E

By subjecting 2-acetyl-furan to a condensation reaction with an aliphatic or aromatic aldehyde (with the exception of a pyridyl-aldehyde referred to in Method D) to form an αβ-unsaturated ketone of the formula

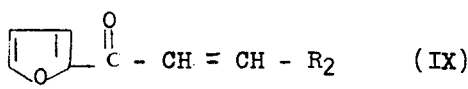 (IX)

wherein $R_2$ has the meanings defined for R in formula I except hydrogen and pyridyl which may then be cyclized with a pyridinium salt of the formula IV or V to yield a compound of the formula

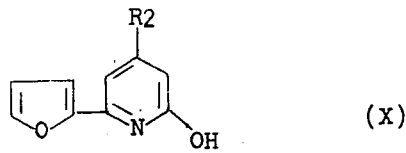 (X)

wherein $R_2$ has the meanings defined above.

The compounds of the formula I and Ia exist in tautomeric equilibrium with the corresponding pyridones.

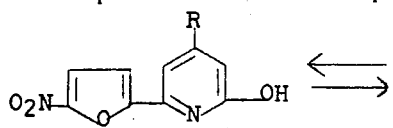

and

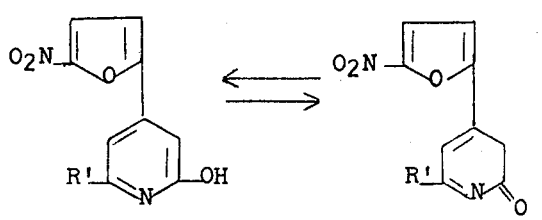

The following examples illustrate the preparation of various compounds of the formulas I and Ia.

EXAMPLE 1

4-(5'-Nitro-2'-furyl)-6-(2''-pyridyl)-2(1H)-pyridone a. 1-(Furyl-2')-3-pyridyl-2'')-propen-(1)-one-(3)

4 liters of 1N sodium hydroxide were cooled to 0°C. in a vessel having a capacity of 10 liters, and then, while stirring, a mixture consisting of 605 gm (5mols) of 2-acetyl-pyridine and 480 gm (5 mols) of 2-furaldehyde was allowed to flow into the vessel over a period of 1 hour. Thereafter, the reaction mixture was stirred for 1 hour more at 0°C., then vacuum-filtered, and the filter cake was washed with 10 liters of water, dried and recrystallized from benzene/cyclohexane, yielding 96.5% of theory of the ketone of the formula

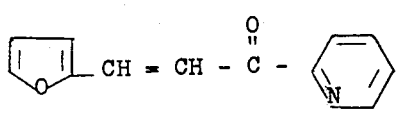

which had a melting point of 50°–51°C.

b. 2-(Pyridyl-2')-4-(furyl-2'')-pyridone-(6) by Method B

A mixture consisting of 800 gm (4 mols) of the ketone obtained in (a), 965 gm (4.8 mols) of carbethoxymethyl-pyridinium chloride, 2.4 kg of ammonium acetate and 2.5 liters of ethanol was refluxed for 1 hour. Thereafter the still hot reaction solution was poured into 8 liters of water, and the precipitate formed thereby was collected by vacuum filtration and recrystallized from ethanol, yielding 89% of theory of the compound of the tautomeric formulas

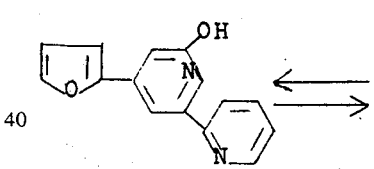

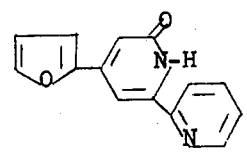

which had a melting point of 207°– 208°C.

c. 476.5 gm (2 mols) of the end product obtained in (b) were introduced into 1.5 liters of concentrated sulfuric acid at 40°– 50°C., while stirring. The resulting mixture was cooled to 0°C., and then a mixture consisting of 100 ml of concentrated nitric acid ($d = 1.53$; 2.4 mols) and 200 ml of concentrated sulfuric acid was added dropwise thereto over a period 2 hours. The resulting dark solution was then poured into 8 liters of water, the precipitate formed thereby was collected by vacuum filtration and again suspended in about 8 liters of water, and the aqueous suspenion was admixed with ammonium hydroxide until it reacted distinctly alkaline. The alkaline aqueous mixture was again vacuum-filtered, and the filter cake was washed with an ample amount of water and recrystallized from glacial acetic acid, yielding 92% of theory of the tautomeric formulas

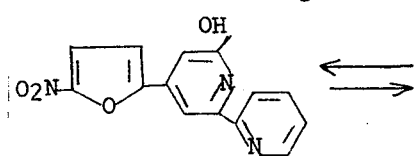 ⇌

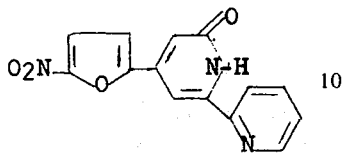

having a melting point above 300°C. (decomp.).

EXAMPLE 2

6-(5'-Nitro-2'-furyl)-4-(4''-pyridyl)-2(1H)-pyridone a. 1-(Pyridyl-4')-3-(furyl-2'')-propen-(1)-one-(3)

A mixture consisting of 100 gm (0.03 mol) of pyridine-4-aldehyde, 103 gm (0.93 mol) of 2-acetyl-furan, 100 ml of 70% perchloric acid and 300 ml of toluene was stirred at 70°–80°C. for 1 hour. Thereafter, the crystalline precipitate was collected by vacuum filtration and washed with a little cold methanol, yielding 83 gm of the perchlorate of the olefinic ketone of the formula

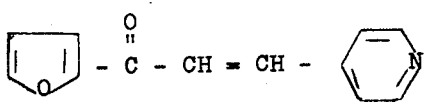

which had a melting point of 195°C.

b. 2-(Furyl-2')-4-(pyridyl-4'')-pyridone-6 by method D 83 gm (0.2 mol) of the product obtained in (a) and 38 gm (0.2 mol) of (N-carbamoyl-methyl)-pyridinium chloride were dissolved in 250 ml of methanol, 24 gm (0.4 mol) of sodium methylate were added to the solution, and the mixture was allowed to stand overnight at room temperature. Thereafter, the reaction mixture was acidified with glacial acetic acid, and the resulting solution was evaporated on a water bath. The solid residue was triturated with water and then vacuum-filtered, and the filter cake was washed with water and methanol, yielding 67 gm of the compound of the tautomeric formulas

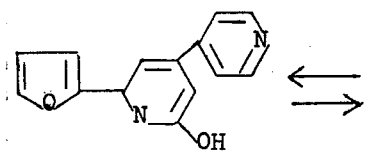

⇌

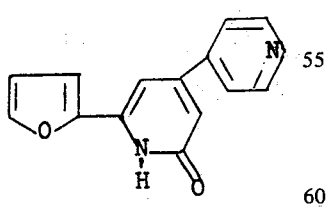

which had a melting point of 225°–226°C.

c. Using a procedure analogous to that described in Example 1(c), the compound of the tautomeric formulas

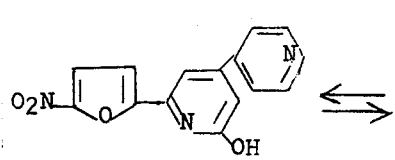 ⇌

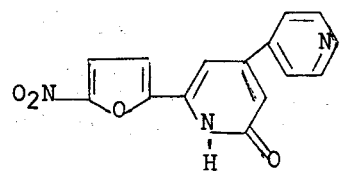

having a melting point of 310°–314°C. was obtained from the end product obtained in (b).

EXAMPLE 3

6-(5'-Nitro-2'-furyl)-2(1H)-pyridone a. (β-Dimethylamino-ethyl)-(furyl-2)-ketone hydrochloride 440 gm (4 mols) of 2-acetyl-furan, 240 gm (8 mols) of paraformaldehyde and 406 gm (5 mols) of dimethylamine hydrochloride were suspended in 960 ml of ethanol, 10 ml of concentrated hydrochloride acid were added to the suspension, and the resulting mixture was boiled for 4 hours, accompanied by stirring. Thereafter, the reaction mixture was allowed to cool, and the crystalline precipitate was collected by vacuum filtration, yielding 73% of theory of the Mannich salt of the formula

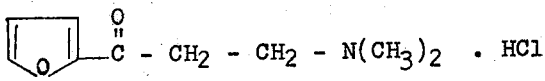

which had a melting point of 180°–181°C.

b. 6-(Furyl-2')-2(1H)-pyridone by Method C 43.5 gm (0.55 mol) of pyridine were heated to 100°C., and then 61 gm (0.5 mol) of ethyl chloroacetate were added dropwise at a rate such that the temperature of the mixture was held at 105°C. without exterior heating. After all of the chloroacetate had been added and the reaction had subsided, the molten mixture was taken up in 300 ml of ethanol, 0.5 mol of the Mannich salt obtained in (a) and 300 gm of ammonium acetate were added to the solution, and the mixture was refluxed for 2.5 hours. Thereafter, the ethanol was distilled off in vacuo, the residue was triturated with about 200 ml of water, and the crystalline product was collected by vacuum filtration and recrystallized from isopropanol, yielding 56% of theory of the compound of the tautomeric formulas

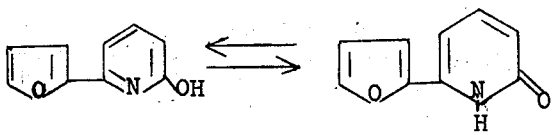

which had a melting point of 168°–169°C.

c. Using a procedure analogous to that described in Example 1(c), the compound of the tautomeric formulas

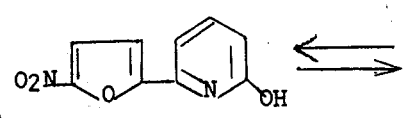 ⇌

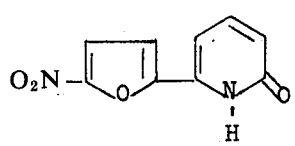

having a melting point of 280°C. (decomp.) after recrystallization from dioxane was obtained from the end product obtained in (b).

EXAMPLE 4

Using a procedure analogous to that described in Example 1(c), 4-(5'-nitro-2'-furyl)-6-(pyridyl-4'')-2(1H)-pyridone, m.p. 340°C, of the tautomeric formulas

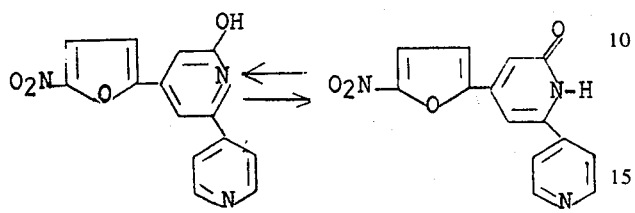

was obtained from 4-(furyl-2'')-6-(pyridyl-4'')-2-(1H)-pyridone.

EXAMPLE 5

Using a procedure analogous to that described in Example 1(c), 4-(5'-nitro-2'-furyl)-6-(pyridyl-3'')-2(1H)-pyridone, m.p. 320°–322°C, of the tautomeric formulas

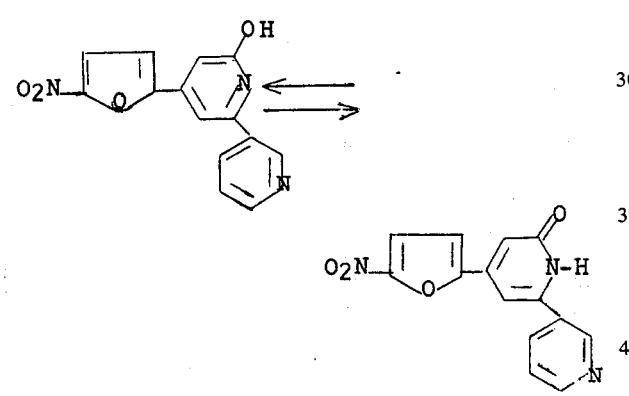

was obtained from 4-(furyl-2')-6-(pyridyl-3'')-2(1H)-pyridone.

EXAMPLE 6

Using a procedure analogous to that described in Example 1(c), 4-(5'-nitro-2'-furyl)-6-methyl-2(1H)-pyridone, m.p. 312°–316°C, of the tautomeric formulas

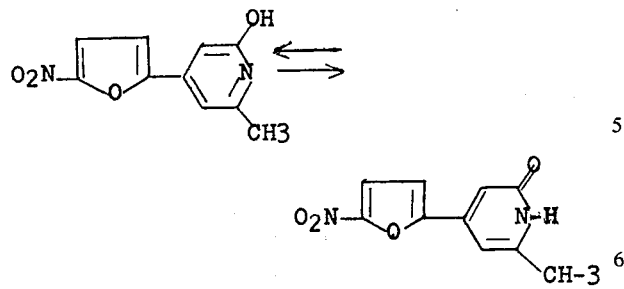

was obtained from 4-(furyl-2')-6-methyl-2(1H)-pyridone.

EXAMPLE 7

Using a procedure analogous to that described in Example 1(c), 6-t-butyl-4-(5'-nitro-2'-furyl)-2(1H)-pyridone, m.p. 290°–293°C, of the tautomeric formulas

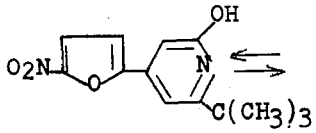
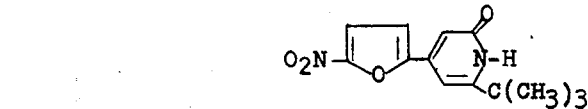

was obtained from 6-t-butyl-4-(furyl)-2')-2(1H)-pyridone.

EXAMPLE 8

Using a procedure analogous to that described in Example 1(c), 6-(5'-nitro-2'-furyl)-4-(3'', 5''-dinitro-4''-hydroxy-phenyl)-2(1H)-pyridone, m.p. 284°–285°C, of the tautomeric formulas

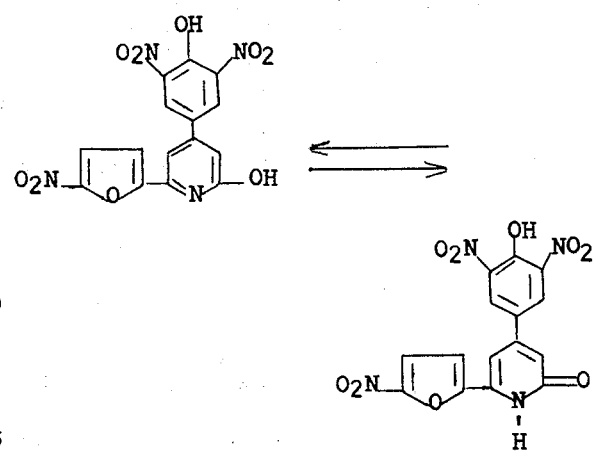

was obtained from 6-(furyl-2')-4-(3'', 5''-dinitro-4''-hydroxy phenyl)-2(1H)-pyridone.

EXAMPLE 9

Using a procedure analogous to that described in Example 1(c), 6-(5'-nitro-2'-furyl)-4-(p-chloro-phenyl)-2(1H)-pyridone, m.p. 320°C, of the tautomeric formulas

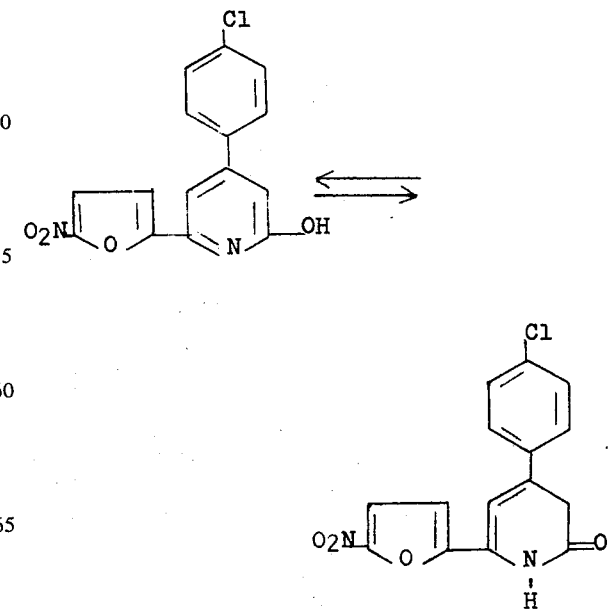

was obtained from 6-(furyl-2')-4-(p-chloro-phenyl)-2(1H)-pyridone.

EXAMPLE 10

Using a procedure analogous to that described in Example 1(c), 6-(5'-nitro-2'-furyl)-4-(pyridyl-2'')-2-(1H)-pyridone, m.p. 298°–300°C, of the tautomeric formulas

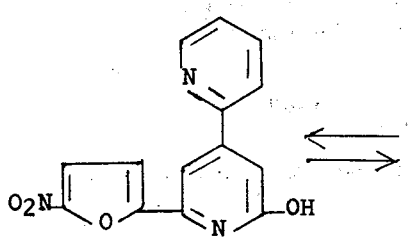

was obtained from 6-(furyl-2')-4-(pyridyl-2'')-2-(1H)-pyridone.

EXAMPLE 11

Using a procedure analogous to that described in Example 1(c), 6-(5'-nitro-2'-furyl)-4-(pyridyl-3'')-2(1H)-pyridone, m.p. 300°C, was obtained from 6-(furyl-2')-4-(pyridyl-3'')-2(1H)-pyridone.

EXAMPLE 12

Using a procedure analogous to that described in Example 1(c), 6-(5'-nitro-2'-furyl)-4-(p-nitro-phenyl)-2(1H)-pyridone, m.p. 330°–335°C, of the tautomeric formulas

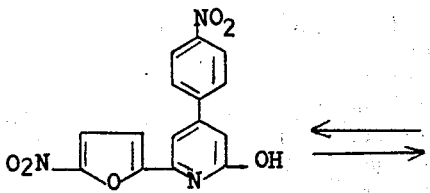

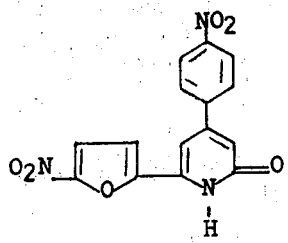

was obtained from 6-(furyl-2')-4-(p-nitro-phenyl)-2(1H)-pyridone.

EXAMPLE 13

Using a procedure analogous to that described in Example 1(c), 6-(5'-nitro-2'-furyl)-4-n-propyl-2(1H)-pyridone, m.p. 215°–218°C, of the tautomeric formulas

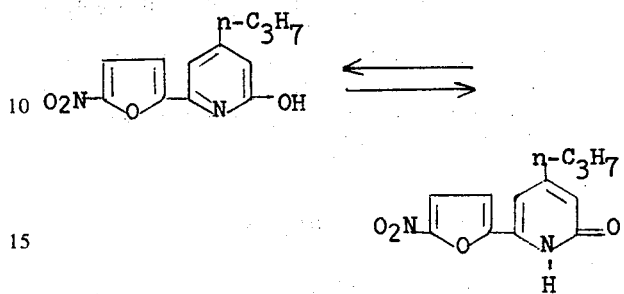

was obtained from 6-(furyl-2')-4-n-propyl-2(1H)-pyridone.

The compounds embraced by formulas I have useful pharmacodynamic properties. More particularly, they exhibit antimicrobial activity against a broad spectrum of pathogenic bacteria, fungi and protozoa, such as Staph. aureus, Streptoc.; E. coli, Salmonella, Shigella, Klebsiella pneum.; Trich. ment.; Trichomonas vag., Trichomonas foet.; Entamoeba hist., especially against gramnegative microorganisms, coupled with low toxicity, and may therefore be effectively used externally as well as internally, particularly for combatting infections of the intestinal and urogenital tract in warm-blooded animals, such as dogs, cats, horses and cattle.

Especially well suited for external use are those compounds of the formula I and Ia wherein R is alkyl, particularly methyl; for internal use, those wherein R is pyridyl are especially well suited. Among the latter 4-(5'-nitro-2'-furyl)-6-(pyridyl-2'')-2(1H)-pyridone is particularly preferred.

For pharmaceutical purposes the compounds of the formulas I and Ia are administered to warm-blooded animals topically, perorally or parenterally as active ingredients in customary pharmaceutical compositions, that is, compositions consisting essentially of an inert pharmaceutical carrier and effective amount of the active ingredient, such as tablets, coated pills, capsules, wafers, powders, solutions, suspensions, emulsions, syrups, suppositories, ointments, tinctures and the like. An effective amount of the compounds according to the present invention for internal administration is from 1.0 to 100.0 mgm/kg body weight; their effective concentration in compositions for external application is from 0.1 to 10.0% by weight based on the total weight.

The following examples illustrate a few pharmaceutical compositions comprising a compound of the formula I or Ia as an active ingredient and represent the best modes contemplated of putting the invention into practical use. The parts are parts by weight unless otherwise specified.

EXAMPLE 14 Tablets

The tablet composition is compounded from the following ingredients:

| | | |
|---|---|---|
| 4-(5'-Nitro-2'-furyl)-6-(pyridyl-2'') 2(1H)-pyridone | 100.0 | parts |
| Corn starch | 125.0 | " |
| Lactose | 85.0 | " |
| Colloidal silicic acid | 5.0 | " |
| Soluble starch | 8.0 | " |
| Magnesium stearate | 2.0 | " |
| Total | 325.0 | parts |

Preparation:

The pyridine compound, the lactose and 110 parts of the corn starch are intimately admixed with each other, the mixture is granulated through a screen with the aid of an aqueous solution of the soluble starch, the dried granulate is admixed with the remaining ingredients, and the resulting composition is compressed into 324 mgm-tablets in a conventional tablet-making machine. Each tablet contains 100 mgm of the pyridine compound and is an oral dosage unit composition with effective antimicrobial action.

EXAMPLE 15

Coated pills

The pill core composition is compounded from the following ingredients:

| | | |
|---|---|---|
| 4-(5'-Nitro-2'-furyl)-6-(pyridyl-2'') 2(1H)-pyridone | 100.0 | parts |
| Lactose | 50.0 | '' |
| Corn starch | 60.0 | '' |
| Colloidal silicic acid | 3.0 | '' |
| Soluble starch | 5.0 | '' |
| Magnesium stearate | 2.0 | '' |
| Total | 220.0 | parts |

Preparation:

The pyridine compound, the lactose and 50 parts of the corn starch are intimately admixed with each other, the mixture is granulated through a screen with the aid of an aqueous solution of the solution starch, the dried granulate is admixed with the remaining ingredients, and the resulting composition is compressed into 220 mgm-pill cores which are subsequently coated with a thin shell consisting essentially of a mixture of sugar, talcum, gum arabic and titanium dioxide. Each coated pill contains 100 mgm of the pyridine compound and is an oral dosage unit composition with effective antimicrobial action.

EXAMPLE 16

Suspension

The suspension is compounded from the following ingredients:

| | | | |
|---|---|---|---|
| 6-(5'-Nitro-2'-furyl)-2(1H)-pyridone | | 5.0 | parts |
| Saccharose | | 20.0 | '' |
| Sodium carboxymethyl cellulose | | 2.0 | '' |
| Glycerin | | 5.0 | '' |
| Flavoring | | q.s. | |
| Preservative | | q.s. | |
| Demineralized water | q.s.ad | 100.0 | '' |

Preparation:

The ground mixture of the pyridine compound, the sodium carboymethyl cellulose and the glycerine is stirred into the solution of the saccharose and the preservative in the demineralized water, the cellulose was allowed to swell, and then the flavoring is added and the composition is homogenized. The resulting aqueous suspension is an oral dosage unit composition with effective antimicrobial action.

EXAMPLE 17

Lozenges

The lozenge composition is compounded from the following ingredients:

| | | |
|---|---|---|
| 6-(5'-Nitro-2'-furyl)-2(1H)-pyridone | 5.0 | parts |
| Glucose monohydrate | 380.0 | '' |
| Saccharose, powdered | 200.0 | '' |
| Stearic acid | 15.0 | '' |
| Total | 600.0 | parts |

Preparation:

The pyridine compound, the glucose and the saccharose are admixed with each other, the mixture is granulated through a screen with a solution of the stearic acid in 60 gm of ethanol, and the dried granulate is compressed into 600 mgm-lozenges. Each lozenge contains 5 mgm of the pyridine compound and is an oral dosage unit composition with effective antimicrobial action.

EXAMPLE 18

Tincture

The tincture composition is compounded from the following ingredients:

| | | | |
|---|---|---|---|
| 4-(5'-Nitro-2'-furyl)-6-(pyridyl-2'')-2(1H)-pyridone | | 2.0 | parts |
| Ethanol | | 70.0 | '' |
| Glycerine | | 10.0 | '' |
| Cremophor EL | | 2.0 | '' |
| Perfume | | q.s. | |
| Demineralized water | q.s.ad | 100.0 | '' |

Preparation:

The perfume, the Cremophor and the pyridine compound are dissolved in the ethanol, and then the mixture of glycerin and demineralized water is slowly stirred into the ethanolic solution. The resulting tincture is a topical composition with effective antimicrobial action.

EXAMPLE 19

Ointment

The ointment composition is compounded from the following ingredients:

| | | | |
|---|---|---|---|
| 4-(5'-Nitro-2'-furyl)-6-(pyridyl-2'')-2(1H)-pyridone | | 2.0 | parts |
| Vaseline | | 35.0 | '' |
| Paraffin oil | | 12.0 | '' |
| Ceresin | | 5.0 | '' |
| Cremophor FM new | | 3.0 | '' |
| Wool grease | | 4.0 | '' |
| Preservative | | q.s. | |
| Perfume | | q.s. | |
| Demineralized water | q.s.ad | 100.0 | '' |

Preparation:

The vaseline, the ceresin, the Cremophor and the wool grease are intimately admixed with each other, the mixture is heated to 70°C, and then a mixture of the finely divided pyridine compound with the paraffin oil is stirred in. Subsequently, a solution of the preservative in the demineralized water at 70°C is added, the resulting mixture is homogenized, the perfume is added, and the finished composition is stirred until it has cooled. The resulting ointment is a topical composition with effective antimicrobial action.

EXAMPLE 20

Cream

The cream is compounded from the following ingredients:

| | | |
|---|---|---|
| 4-(5'-Nitro-2'-furyl)-6-(pyridyl-2'') | 2.0 | parts |
| Stearyl alcohol | 10.0 | " |
| Yellow vaseline | 15.0 | " |
| Yellow wax | 5.0 | " |
| Glycerin monostearate | 3.0 | " |
| Spermaceti | 5.0 | " |
| Cremophor 0 | 1.0 | " |
| Glycerin | 10.0 | " |
| Preservative | q.s. | |
| Perfume | q.s. | |
| Demineralized water q.s.ad | 100.0 | parts |

Preparation:

The finely divided pyridine compound, the yellow vaseline, the yellow wax, the stearyl alcohol, the glycerin monostearate, the spermacetic and the Cremophor are intimately admixed with each other, and the mixture is heated to 70°C. A solution of the preservative in the mixture of the glycerin and water at 70°C is then added, the composition is homogenized, the perfume is added, and the finished cream is stirred until it has cooled. The cream is a topical composition with effective antimicrobial action.

EXAMPLE 21

Powder

The powder is compounded from the following ingredients:

| | | |
|---|---|---|
| 6-(5'-Nitro-2'-furyl)-2(1H)-pyridone | 2.0 | parts |
| Perfume | q.s. | |
| Colloidal silicic acid | 3.0 | " |
| Talcum | 40.0 | " |
| Wheat starch q.s.ad | 100.0 | " |

Preparation:

The ingredients are admixed, and the mixture is milled into a powder which is a topical composition with effective antimicrobial action.

Analogous results are obtained when any one of the other pyridine derivatives embraced by formulas I and Ia is substituted for the particular pyridine compound in Examples 14 through 21. Likewise, the amount of active ingredients in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to those skilled in the art that the invention is not limited to these particular embodiments, and that various changes and modifications may be made without departing from the spirit of the invention or the scope of the appended claims.

We claim:

1. A pharmaceutical composition for combatting pathogenic microorganisms selected from the group consisting of bacteria, fungi and protozoa, said composition consisting essentially of an inert pharmaceutical carrier and an effective antibacterial, anti-fungal or anti-protozoal amount of a compound of the formula

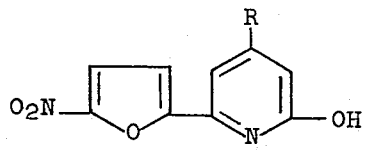

or

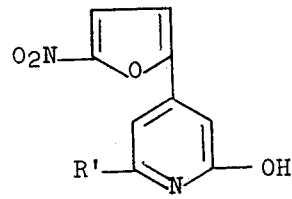

wherein
R is hydrogen, pyridyl, alkyl of 1 to 4 carbon atoms, phenyl, p-chloro-phenyl, p-(alkyl of 1 to 4 carbon atoms)-phenyl, p-nitro-phenyl or 3,5-dinitro-4-hydroxyphenyl, and
R' is hydrogen, pyridyl or alkyl of 1 to 4 carbon atoms,
or a 2(1H)-pyridone tautomer thereof.

2. A composition of claim 1, wherein R and R' are alkyl of 1 to 4 carbon atoms.

3. A composition of claim 1, wherein R and R' are methyl.

4. A composition of claim 1, wherein said compound is 4-(5'-nitro-2'-furyl)-6-(pyridyl-2'')-2(1H)-pyridone.

5. A composition of claim 1, wherein said compound is 6-(5'-nitro-2'-furyl)-2(1H)-pyridone.

6. The method of killing pathogenic microorganisms selected from the group consisting of bacteria, fungi and protozoa which topically or internally inhabit a warm-blooded animal host, which comprises topically, perorally or parenterally administering to said host an effective anti-bacterial, anti-fungal or anti-protozoal amount of a compound of the formula

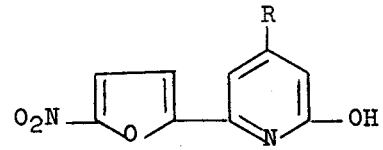

or

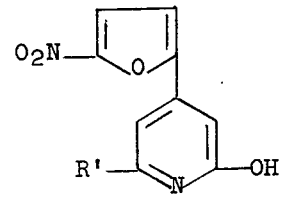

wherein
R is hydrogen, pyridyl, alkyl of 1 to 4 carbon atoms, phenyl, p-chloro-phenyl, p-(alkyl of 1 to 4 carbon atoms)-phenyl, p-nitro-phenyl or 3,5-dinitro-4-hydroxyphenyl, and
R' is hydrogen, pyridyl or alkyl of 1 to 4 carbon atoms,
or a 2(1H)-pyridone tautomer thereof.

7. The method of claim 6, wherein R and R' are alkyl of 1 to 4 carbon atoms.

8. The method of claim 6, wherein R and R' are methyl.

9. The method of claim 6, wherein said compound is 4-(5'-nitro-2'-furyl)-6-(pyridyl-2'')-2(1H)-pyridone.

10. The method of claim 6, wherein said compound is 6-(5'-nitro-2'-furyl)-2(1H)-pyridone.

* * * * *